United States Patent [19]
Payton et al.

[11] Patent Number: 5,966,863
[45] Date of Patent: Oct. 19, 1999

[54] LIQUID BAIT STATION FOR ANTS AND COMBINED ANT/RODENT STATION

[75] Inventors: Charles H. Payton, Brentwood; T. James Gibson, Mountain View; William T. Cress, Campbell, all of Calif.

[73] Assignee: A-Pro Pest Control, Inc., Campbell, Calif.

[21] Appl. No.: 09/012,531

[22] Filed: Jan. 23, 1998

[51] Int. Cl.$^6$ .................................................. A01M 25/00
[52] U.S. Cl. .............................................................. 43/131
[58] Field of Search ............................ 43/107, 131, 121, 43/132.1, 124

[56] References Cited

U.S. PATENT DOCUMENTS

| | | | |
|---|---|---|---|
| D. 289,315 | 4/1987 | Baker et al. ............................ | D22/119 |
| D. 329,681 | 9/1992 | Demarest et al. ...................... | D22/122 |
| D. 358,629 | 5/1995 | Wefler .................................... | D22/122 |
| 794,323 | 7/1905 | Small . | |
| 1,309,606 | 7/1919 | Bartholomew ........................ | 43/131 |
| 1,700,517 | 1/1929 | Ross ....................................... | 43/131 |
| 1,964,611 | 6/1934 | Watson . | |
| 2,896,362 | 7/1959 | Wingate ................................. | 43/131 |
| 3,017,717 | 1/1962 | Caubre . | |
| 4,026,064 | 5/1977 | Baker ..................................... | 43/131 |
| 4,208,829 | 6/1980 | Manning ................................ | 43/131 |
| 4,550,525 | 11/1985 | Baker et al. ........................... | 43/131 |
| 4,660,320 | 4/1987 | Baker et al. ........................... | 43/131 |
| 5,033,229 | 7/1991 | Demarest et al. ...................... | 43/131 |
| 5,040,327 | 8/1991 | Stack et al. ............................ | 43/131 |
| 5,136,803 | 8/1992 | Sykes et al. ........................... | 43/131 |
| 5,152,097 | 10/1992 | Rhodes .................................. | 43/131 |
| 5,272,832 | 12/1993 | Marshall et al. ...................... | 43/131 |
| 5,406,743 | 4/1995 | McSherry et al. .................... | 43/122 |
| 5,448,852 | 9/1995 | Spragins et al. ....................... | 43/131 |
| 5,467,738 | 11/1995 | Cass ....................................... | 119/61 |
| 5,501,033 | 3/1996 | Wefler .................................... | 43/131 |
| 5,548,922 | 8/1996 | Wefler .................................... | 43/131 |
| 5,577,461 | 11/1996 | Sebastian et al. ..................... | 119/51.5 |

FOREIGN PATENT DOCUMENTS 4335851  11/1992  Japan ........................................ 43/107

OTHER PUBLICATIONS

J.T. Eaton & Co, Inc., brochures entitled "#903TP & #904 Tamper–Resistant Bait Station, Bait Holder Rod Installation Instructions".

J.T. Eaton & Co. Inc., brochures entitled "#910 Tamper–Resistant Bait Station, Bait Holder Rod Installation Instructions".

*Primary Examiner*—Thomas Price
*Attorney, Agent, or Firm*—Thomas Schneck; Mark Protsik; David M. Schneck

[57] ABSTRACT

A liquid bait station for ants has separate nested inner and outer container sections with the inner container forming a liquid bait reservoir. The inner container section or reservoir has a lid that is closed whenever the outer container is closed, and access to the reservoir of liquid bait by the ants is indirect via one or more container access ports leading to a compartment inside the outer container and then via separate reservoir access ports leading from the compartment to the reservoir. In one embodiment, the reservoir lid comprises a raised portion in the inner surface of the outer container's own cover and the reservoir access ports are formed by depressions in that raised portion. In a second embodiment, the inner and outer container sections have separate lids, but at least one tang depending from the outer cover closes and holds down the inner lid whenever the outer cover is closed. The reservoir access ports can be holes in the inner lid. In a third embodiment, the ant bait station can be combined in a single integrated unit with a rodent bait station, provided there is a separate internal compartment and separate access for the rodents, and provided a partition completely isolates the ant compartment from the rodent compartment.

10 Claims, 4 Drawing Sheets

LIQUID BAIT STATION FOR ANTS AND COMBINED ANT/RODENT STATION

TECHNICAL FIELD

The present invention relates to vermin-destroying poison holders or bait stations for insects, especially crawling insects, such as ants, and also to those poison holders that contain multiple compartments for both insects and rodents.

BACKGROUND ART

In U.S. Pat. No. 3,017,717, Caubre describes a container for an open bottle of ant poison that is accessible to ants but that cannot be opened by a child. The container is a box with a hinged side wall. A steel pin extends through a bore in a top wall of the box and into an elongate recess in a lug attached to the inside of the hinged side wall, thereby locking the box closed. Since the pin does not protrude from the bore, it cannot be removed by hand, but must instead be drawn out by a magnet in order to unlock the box. Small holes in an end wall of the box give ants ready access to the open bottle of poisonous bait inside the box. Presumably, the poison should be sufficiently viscous to avoid leakage from the bottle through the ant access holes if up-ended by a child.

In U.S. Pat. No. 5,033,229, Demarest et al. describe a liquid bait station for roaches. The bait station has a base structure that includes a central well area with an absorbent pad and a plurality of insect access openings in side walls surrounding the well area. The bait station also has a funnel-shaped reservoir seated in the base structure and tapering to a narrow opening at its bottom for controllably releasing liquid bait onto the absorbent pad in the central well area. The larger upper end of the funnel-shaped reservoir has a cover.

In U.S. Pat. No. 5,548,922, Wefler describes an insect liquid bait station that includes a base having a floor and a peripheral dike that together define a reservoir for a slow-kill liquid insecticide. A porous pad sits in the pooled liquid on the floor of the reservoir. A cover is mounted in liquid-tight relation on the base. The cover has an inclined ramp leading down to a central stage area with access portals through which the target insects can enter and feed on the poisonous liquid on the porous pad. The tight mounting of the cover to the base and the use of a porous pad immediately beneath the access ports resist spillage of the liquid bait.

In U.S. Pat. No. 794,323, Small describes a poison vault for rodents which is constructed so that the poison bait is accessible to mice and rats, but not to fowl and larger animals, and also so that the rodents cannot carry away any large pieces of the bait. The vault includes an outer box with a hinged top. The outer box has round openings at an upper portion of each side and end wall, large enough to admit rats and mice, and at a height from the bottom so that the rodents must stand on their hind feet to pass through the opening. The vault also includes an inner box with side and end walls secured to the bottom of the outer box (but no lid) and separated from the outer walls to create a space between the inner and outer walls into which the rodents must first enter before passing through similar openings in the walls of the inner box. Because the rodents must stand on their hind feet to traverse the openings, they are unable to carry large pieces of bait with their feet and must leave the pieces behind or consume them while in the box. The hinged top of the outer box may be provided with a hook that engages a pin to securely close the box.

U.S. Pat. Nos. 4,026,064; 4,550,525; 5,040,327; 5,272,832; and 5,448,852 disclose other rodent bait stations. In general, these consist of a protective box provided with access holes, interior rooms or trays containing solid bait, and passageways from the holes to the rooms or trays. Bolts, ties or other means may be used to provide tamper resistant closure of these boxes. J.T. Eaton & Co., Inc. of Twinsbury, Ohio provides several models of rodent bait stations that use bait holding rods or racks in interior rooms, where the bait is in the form of blocks that can be slid onto the rod.

U.S. Pat. No. 1,964,611 to Watson discloses a combined rodent and insect exterminator station with separate compartments for solid rodent bait and liquid insect bait within an enclosed structure. The structure has openings that allow entry of rodents but that keep out chickens. The insect bait appears not to be sufficiently isolated from the rodent feeding compartments, so that mice or rats would have to traverse or pass by the insect bait area to reach the rodent bait. Rodents would be unlikely to feed in the presence of large numbers of ants.

An object of the invention is to provide a liquid bait station for ants or other crawling insects constructed to resist spillage of bait within the bait station.

Another object of the invention is to provide a liquid bait station with improved access to liquid bait by the target crawling insects.

Still another object of the invention is to provide a liquid bait station which is tamper resistant.

Another object of the invention is to provide a combined bait station with liquid bait for ants and solid bait for rodents, wherein rodents will feel comfortable feeding even when ants are also feeding in their own bait.

DISCLOSURE OF THE INVENTION

The objects of the invention are met in a bait station in which an outer container section of the station has at least one internal compartment with a separate inner container nested therein forming a liquid bait reservoir. Access to this reservoir of liquid bait is indirect via one or more container access ports leading to the internal compartment and separate reservoir access ports leading from the internal compartment to the liquid bait. The reservoir has a lid that is closed whenever the outer container is closed. In one embodiment, the reservoir lid is a raised portion of the container's cover that fits over the inner container when the cover is closed. The reservoir access ports are formed by depressions in that raised portion. In another embodiment, the inner and outer containers have separate lids, but the outer cover or lid has at least one tang depending therefrom to contact the inner lid and hold it down in a closed position when the outer cover is closed. The reservoir access ports may be one of more holes in this inner lid. The reservoir may include a grid-like insert that provides ant walkways on its top surface, improving access to the bait.

The outer container may include a tamper-resistant lock that includes a vertical channel through a thickened portion of a container side wall and a matching hole in the container's cover. A screw, nail or other stake inserted into the hole and channel anchors the bait station to the ground and simultaneously keeps the cover and interior reservoir lid closed. If the stake is threaded, as in a screw, the cover remains closed even if the stake is removed from the ground.

The liquid bait station for ants may be combined with a rodent bait station by including a separate internal compartment for the rodents. A partition that extends to the container's cover completely isolates the ant and rodent compartments internally to prevent ants feeding in the liquid bait reservoir from wandering into the rodent compartment.

Access by rodents to their bait compartment is via separate access ports in the container. The solid rodent bait may be suspended by a bait rod or rack and passageways leading from the container access ports to the bait provide a secure environment in which the rodents may feel comfortable feeding.

BEST MODE OF CARRYING OUT THE INVENTION

Figure 1:
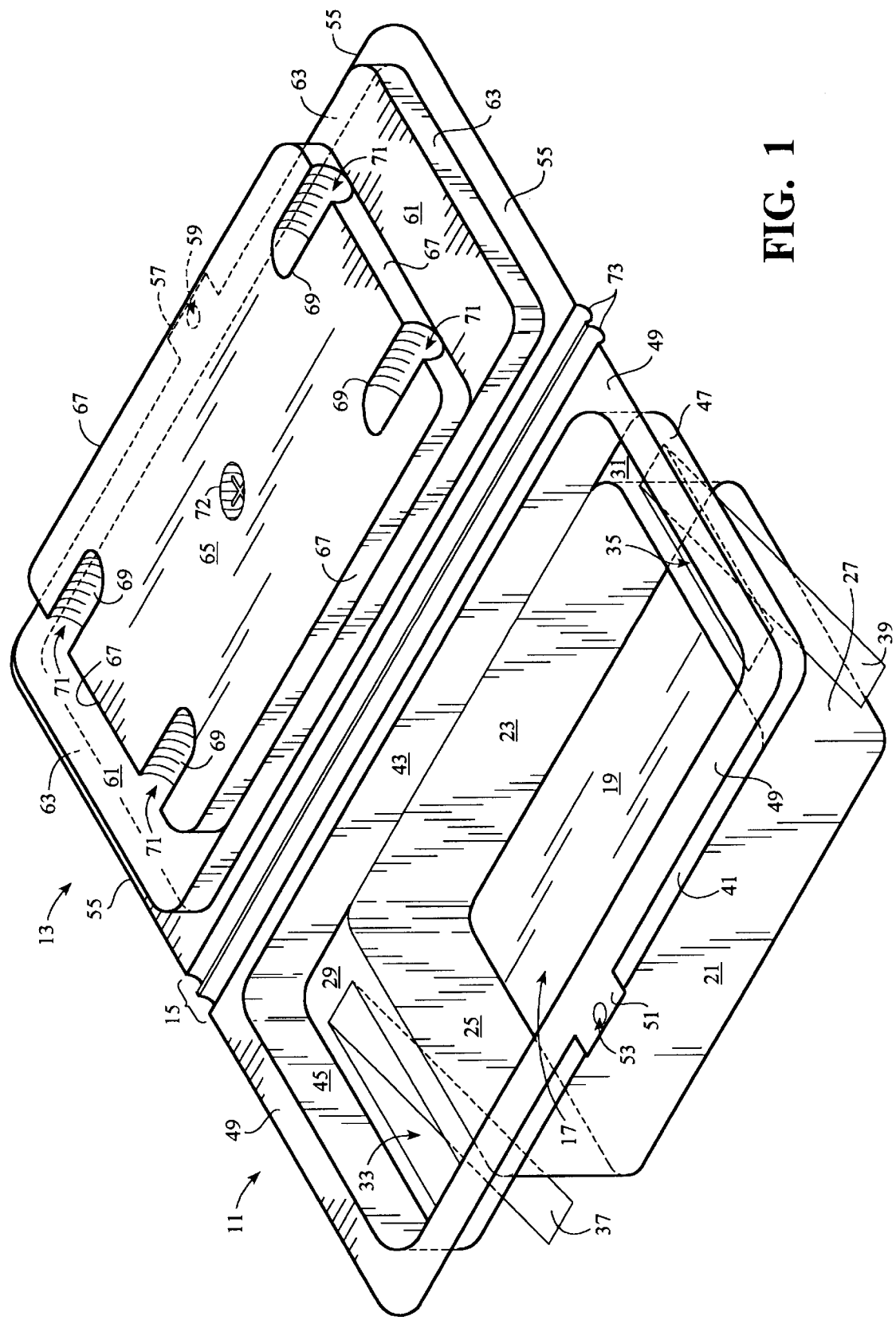
FIG. 1 is a perspective view of a first liquid ant bait station embodiment of the present invention.

With reference to FIG. 1, an ant bait station of the present invention is seen which is made of a single piece of molded plastic, for example of polystyrene or acrylonitrile-butadiene-styrene (ABS), with wall thicknesses of at least 6 mils (150 μm) and typically of about 100 mils (2.5 mm). The bait station of FIG. 1 has a container section 11 and a lid section 13 connected by a hinge section 15. The overall dimensions of the bait station when closed is typically about 8⅝ inches (22 cm) long, 4 inches (10 cm) wide and 1½ inches (4 cm) high. Other bait station dimensions are possible.

The container section 11 includes a reservoir 17 for poisonous liquid ant bait. The reservoir 17 has a bottom or floor 19, front and rear walls 21 and 23 and side walls 25 and 27. Typical reservoir dimensions are 6 inches (15 cm) long from side wall 25 to side wall 27, 3½ inches (9 cm) wide from front wall 21 to rear wall 23, and 1 inch (2.5 cm) high from the floor 19 to the top of the reservoir 17. The reservoir 17 thus has a bait volume of approximately 21 cubic inches (344 cm$^3$), although the reservoir 17 need not be completely filled to the brim. The container section 11 also includes platform areas 29 and 31 extending horizontally outward from the tops of side walls 25 and 27. A part of each platform area 29 and 31 may be pre-perforated on three sides and can then be punched out to form openings 33 and 35 with ramps 37 and 39 bent downward so as to make contact with the ground on each side of the bait station. The ramps 37 and 39 with their corresponding openings 33 and 35 may be about 2½ inches (6.4 cm) long from front to back and about ½ inch (1.3 cm) wide from side to side for platforms 29 and 31 that are about 1 inch (2.5 cm) wide from side to side. Upper walls 41, 43, 45 and 47 extend upward approximately ½ inch (1.3 cm) from the outer edges of the platforms 29 and 31 and tops of front and rear walls 21 and 23 of the reservoir 17. In fact, upper walls 41 and 43 are mere continuations of the front and rear walls 21 and 23 except in areas above the platforms 29 and 31. A horizontal lip 49 extends outward from the tops of upper walls 41, 45 and 47 on front and sides of the bait station. The lip 49 can be about ⁵⁄₁₆ inch (8 mm) wide, except in a front central portion 51 that is slightly wider to receive a ¼ to ⁵⁄₁₆ (6 to 8 mm) diameter hole 53.

The lid section 13 of the bait station is shown in FIG. 1 in an open position. The top surfaces of the lid section 13 seen in the drawing form the interior surfaces of the bait station when the lid section 13 is folded over about the hinge section 15 and firmly mated to corresponding portions of the container section 11. In particular, the lid section 13 has a lip 55 with dimensions that substantially match that of lip 49 around the bait station's container section 11. The lip 55 also has a front central wider portion 57 with a hole 59 whose size and position match that of the hole 53 when the lid is closed. Inside the area bounded by the lip 55 are first raised portions 61 defined by a rim 63 whose dimensions precisely match the 8 inch (20 cm) by 3½ inch (9 cm) area defined by upper walls 41, 43, 45 and 47 of container section 11. Thus, when the lid is closed, the rim 63 firmly fits into the container area inside lip 49 so that the outer surface of rim 63 makes contact with the inner surfaces of upper walls 41, 43, 45 and 47, with the raised portions 61 of the lid section 13 extending down into the regions above the platforms 29 and 31. However, since the upper walls 41, 43, 45 and 47 have a typical height of about ½ inch (12.7 mm) and the raised portions 61 of the lid 13 that are defined by the rim 63 have a typical height of only ¼ inch (6.35 mm), the lid portions 61 leave an ant access space above the platforms 29 and 31 of about ¼ inch (6.35 mm).

The central area of the lid section 13 between the first raised portions 61 is a second raised portion 65 even more raised than the first portions 61 so as to form a cover for the reservoir 17. The edges of the second raised portion 65 is defined by a second rim 67 whose dimensions precisely match the 6 inch (15 cm) by 3½ inch (9 cm) dimensions of the reservoir 17. The second rim 67 has a height which is typically about ¼ to ⁵⁄₁₆ inch (6.4 to 7.9 mm) and in its central front and rear portions is merely an extension of the first rim 63. The result is a second raised portion 65 with a height of about ½ to ⁹⁄₁₆ inch (12.7 to 14.3 mm) above the lip 55 that precisely matches or slightly exceeds (by not more than about ¹⁄₁₆ inch (1.6 mm)) the height of the upper walls 41, 43, 45 and 47 of the container section 11, so that the second raised portion 65 firmly fits over or, optionally, slightly into the reservoir 17 to form a cover when the lid section 13 is closed. Extending from the sides of second rim 67 adjacent the first raised portions 61 into the second raised portion 65 are a plurality of half-bullet-shaped depressions 69, typically four in number, that form access ports 71 into the covered reservoir 17 when the lid is shut. The ports 71 are typically ¼ inch (6 mm) in radius and about 2 inches (5 cm) apart on each side. To reach the poison liquid bait, ants ascend the ramps 37 and 39 onto the platforms 29 and 39 and through the access ports 71.

The hinge section 15 connects the container and lid sections 11 and 13 together so that the sections remain a single integrated unit when the lid open. It can include a set of semicylindrical folds 73 that minimizes strain on the hinge 15 when it is folded for lid closure. The matching holes 53 on the opposite ends of the container and lid sections 11 and 13 from the hinge 15 allow the bait station to be tied or bolted shut, or alternatively to be staked to the ground, or both. If desired, there could be more than one such pair of matching holes on the container and lid sections 11 and 13 of the bait station in other portions of their respective lips 49 and 55.

In the center of the second raised portion 65, there is another depression 72, similar to depressions 69 but circular in shape with a typical diameter of about ¼ inch (6 mm). A cross-shaped slit is present in the circular depression 72, forming a fill port into the covered reservoir 17. This allows the reservoir 17 to refilled with liquid ant bait, without having to raise the lid section 13 to open the bait station.

Rather, with the lid section 13 still closed, a fill probe can be inserted through the cross-shaped slit in the circular depression 72 (seen as raised on the exterior of the lid section 13).

Figure 6:
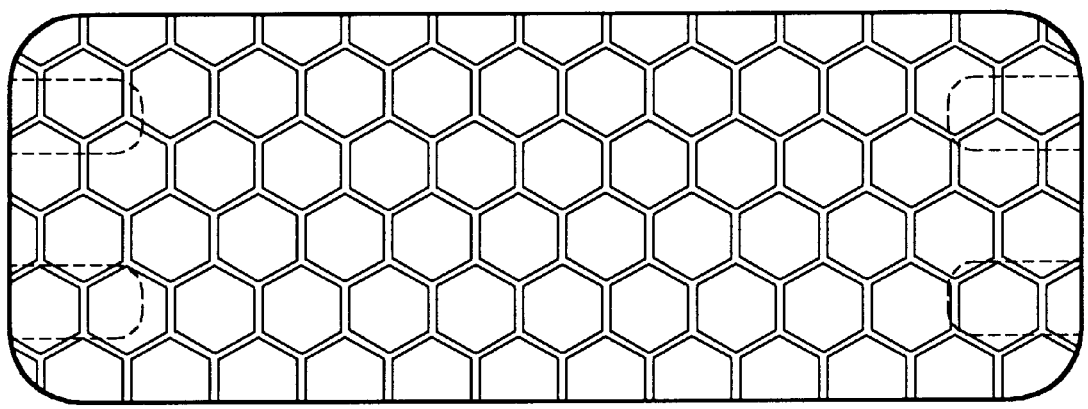
FIG. 6 is a top plan view of a honeycomb grid structure within a liquid bait reservoir of any of the embodiments.

As seen in FIG. 6, any of the ant bait reservoirs, like reservoir 17 in FIG. 1, may includes a honeycomb-like (or other grid) medium with hexagonal or other shaped ant walkways 75 extending across the reservoir 17 forming a plurality of liquid bait-containing cells 77. The medium typically has a height so that the walkways 75 are located at least 1/16 inch (1.6 mm) below the cover surface 65 when the lid is closed. Ants walk through the access ports 71, provided by the bullet-shaped depressions 71 in the second raised portion or cover 65, and out onto the walkways 75. This allows many more ants to feed from the bait at one time. The honeycomb medium may be a plastic insert or even formed from a solid form of the bait.

Figure 2:
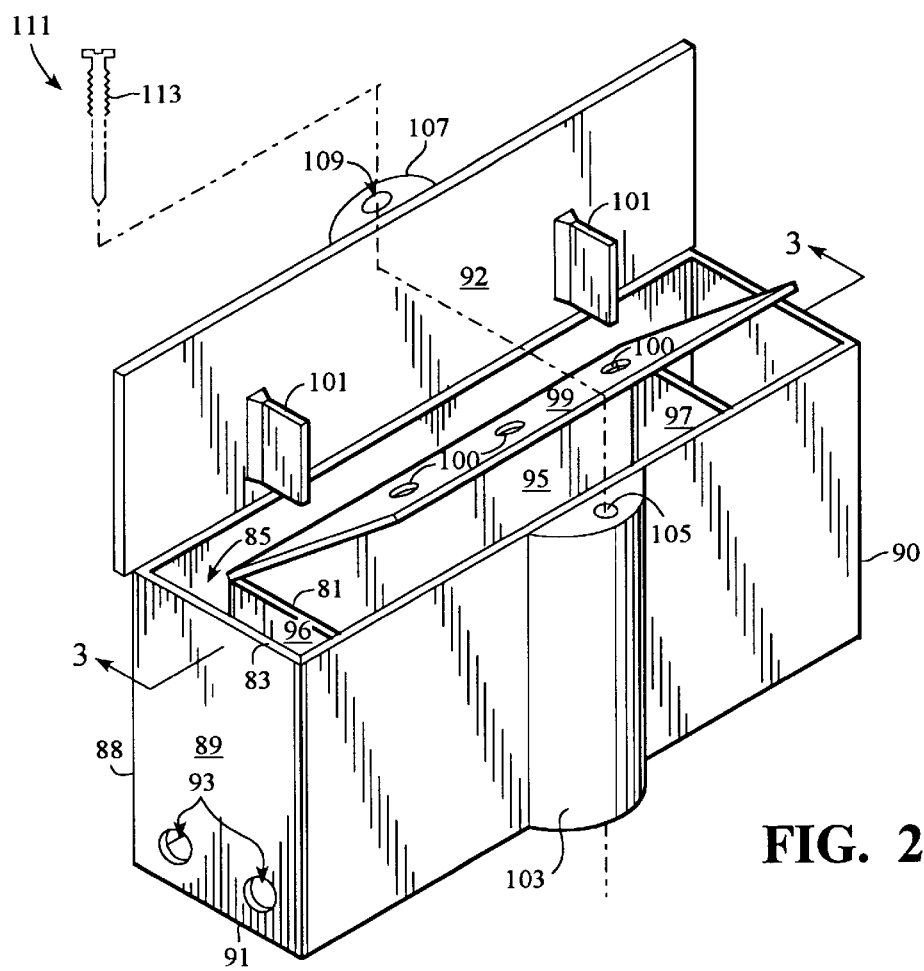
FIG. 2 is a perspective view of a second liquid ant bait station embodiment of the present invention.
Figure 3:
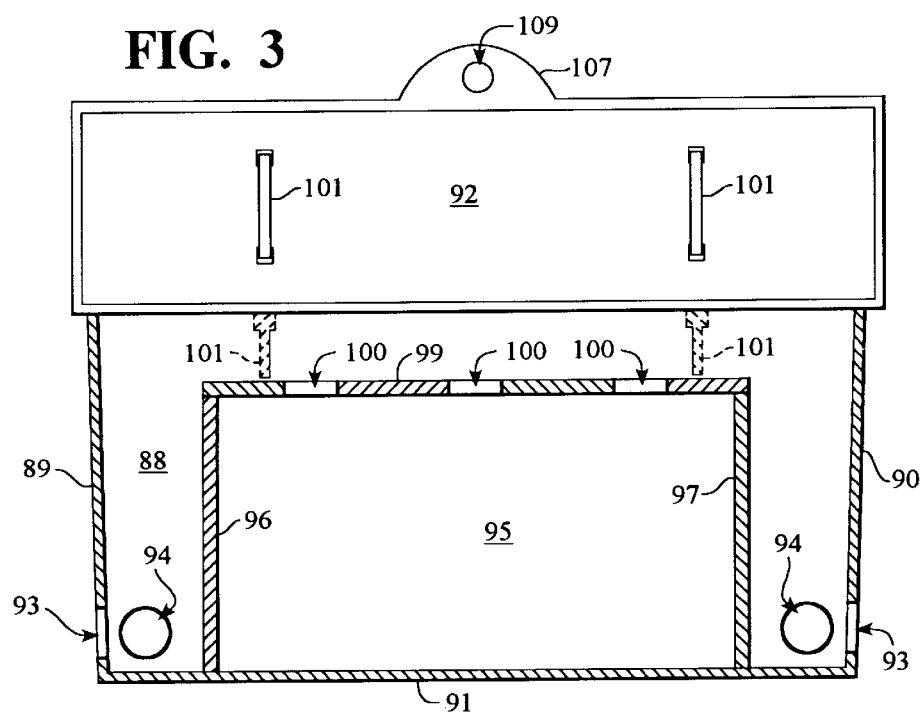
FIG. 3 is a sectional view of the second embodiment taken along the line 3—3 in FIG. 2.

With reference to FIGS. 2 and 3, another embodiment of an ant bait station comprises nested inner and outer containers 81 and 83 in the form of plastic boxes. Both the inner and outer containers may be made of a sturdy plastic material, such as 100 mil (2.5 mm) thick injection-molded ABS, and may have a slightly rough or textured surface for at least the exterior of the inner container 81 in order to facilitate climbing by the ants without slipping. Alternatively, a ramp (not shown) could be provided in the space 85 between the inner and outer containers. The outer container 83 has typical dimensions of about 8 inches (20 cm) long, 2.2 inches (5.6 cm) wide, and 3⅞ inches (10 cm) high. It includes front and rear walls 87 and 88, left and right side walls 89 and 90, a base 91 and a hinged cover 92. The hinged cover 92 may be attached to the rear wall 88 by a bead of plastic material extending along the entire connecting edge or the hinge may be constructed in the same manner as hinge section 73 in the embodiment of FIG. 1. Holes 93 in the side walls 89 and 90, as well as additional holes 94 in the back wall 88, provide access by ants to the interior of the outer container 83. The holes are typically about 5/16 to ½ inch (8 to 13 mm) in diameter. For example, there could be one or two holes 93 in each side wall 89 and 90 and two or more holes 94 in the back wall 88.

The inner container 81 may share the front and rear walls 87 and 88 and base 91 of the outer container 83. Alternatively, there may be a separate inner container rear wall 95 to provide a narrow space 85 between the respective rear walls 88 and 95 for a ramp attached to one or both of those rear walls 88 and 95. The inner container 81 does include separate side walls 96 and 97 that are spaced from the side walls 89 and 90 of the outer container by about 1 1/16 inch (2.7 cm). The walls 95–97 of the inner container 81 are shorter than those of the outer container 83, and are typically about 3 inches (7.6 cm) high. Thus, the interior dimensions of the inner container 81 may be about 5½ inches (14 cm) long, 1½ to 2 inches (4 to 5 cm) wide (depending on the existence of a separate rear wall 95), and 3 inches (7.6 cm) high.

The inner container 81 also includes a separate lid 99 attached to the rear wall 88 or 95 by a thin plastic bead or by a hinge structure like that in FIG. 1. The inner container lid 99 has a set of holes 100 therein, typically three in number and about 5/16 to ½ inch (8 to 13 mm) diameter, to provide access by the ants to the liquid poison bait contained within the inner container 81. (The holes 100 might also be used to fill or refill the inner container 81 with bait without lifting the lid 99, if this is deemed more convenient.) The underside (interior) surface of the outer container's cover 92 has a pair of hold-down tangs 101 depending therefrom to engage the upper surface of the inner container's lid 99 when the cover 92 is shut, thereby closing the lid 99. The tangs 101 are typically spaced about 4½ to 5 inches (11.4 to 12.7 cm) apart and have a height which is substantially equal to the difference in heights between the inner and outer container walls, i.e. about 11/16 inch (17 mm) when material thicknesses are accounted for, so that the tangs 101 precisely contact and hold down the lid 99 when the cover is in the closed position (as indicated by the dashed lines 101 for the closed tang positions in FIG. 3).

Extending integrally outward from the center of the outer container's front wall 87 is a thicker wall portion in the form of a semicylindrical column 103 with a channel 105 passing vertically through the column 103. A tab 107 extends from a front edge of the cover 92 and has a hole 109 therethrough. The hole 109 in the tub 107 aligns with the vertical channel 105 in the column 103 so as to receive a stake 111 such as a nail or screw. Driving a nail or screw into the matching hole 109 and channel 105 and into the ground allows the bait station to be securely anchored to the ground. If at least that upper part 113 of a stake 111 that is placed in the channel 105 is threaded, as for example in a screw, and the channel 105 is either pre-threaded or tapped by the screw itself, then the screw-type stake 111 doubles as a fastener that securely locks the bait station shut in a tamper-resistant manner. The screw must first be removed from the channel 105 and hole 109 in order to open the cover 92, and so the risk of a child pulling the staked bait station out of the ground and opening the station is minimized.

In operation, ants enter the bait station through the access openings or holes 93 and 94 and walk on the floor 91 in the space between the inner and outer containers 81 and 83. Next, the ants climb up to the lid 99 via the inner container walls 95–97, or alternatively via a ramp, and enter the interior of the inner container 81 through the holes 100 in the lid 99. As in the embodiment of FIG. 1, the liquid bait in the inner container 81 may be located within cells 77 of a honeycomb structure 75 (as in FIG. 6) that allows many more ants to reach the poison at one time. Again, the honeycomb-like material 75 may be a plastic insert or a solid form of the poison bait that can also be eaten as the liquid bait level recedes.

Figure 4:
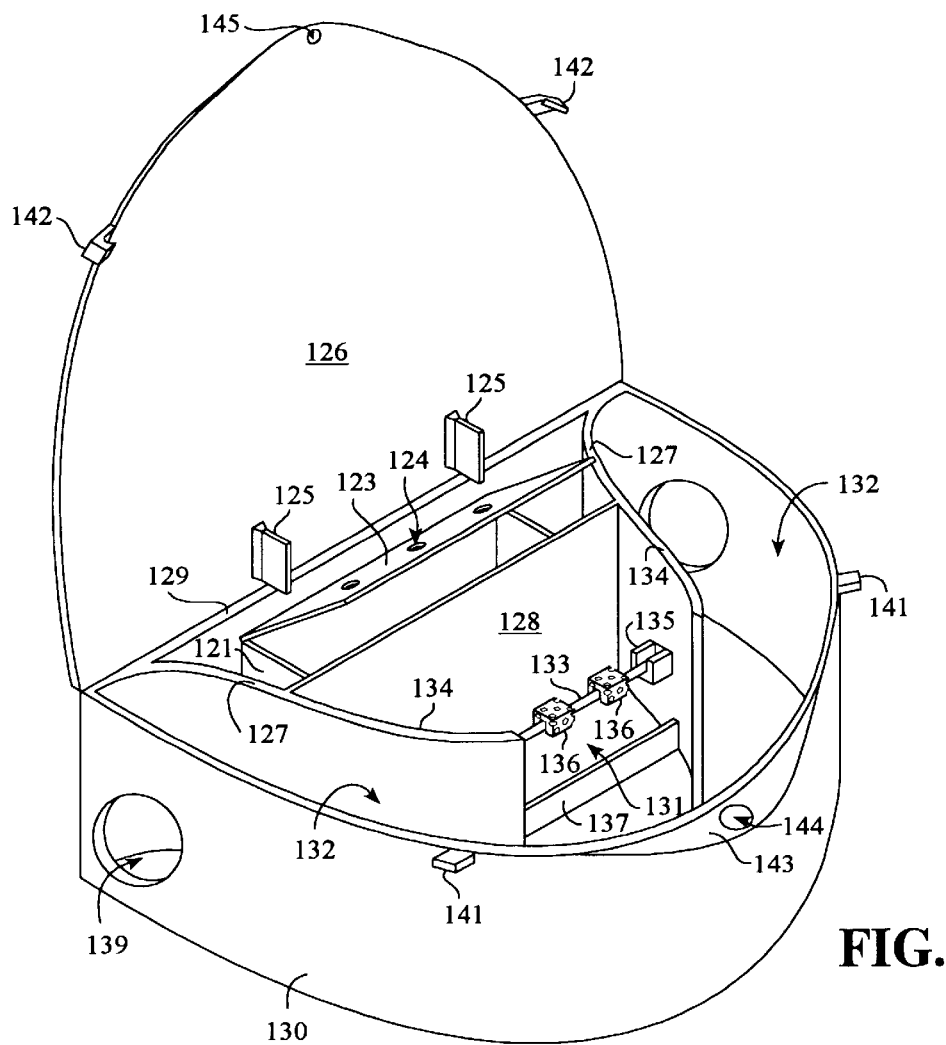
FIG. 4 is a perspective view of a combined ant and rodent bait station embodiment of the present invention.
Figure 5:
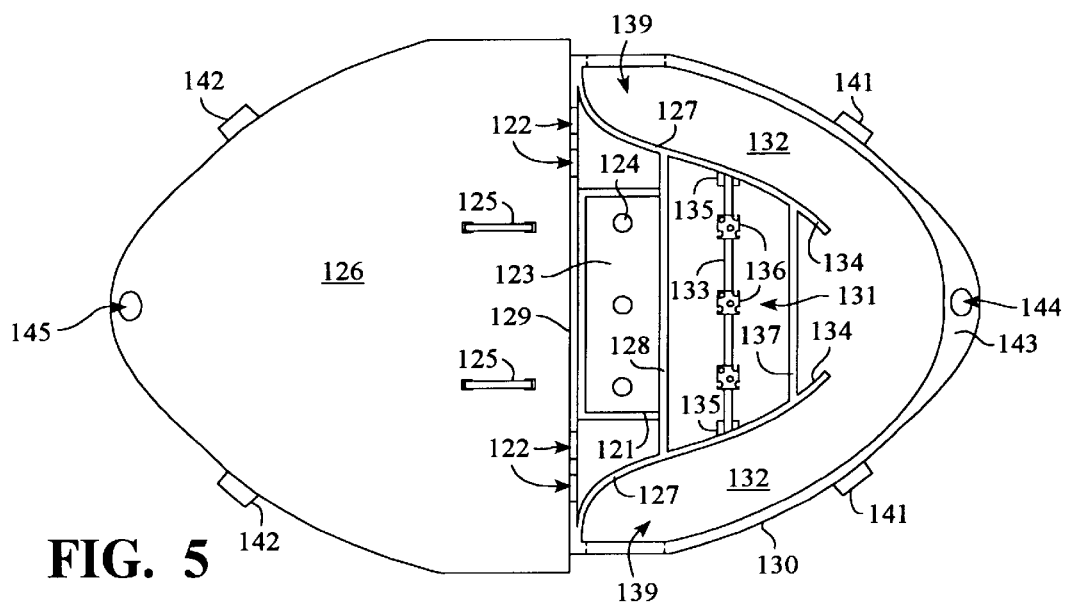
FIG. 5 is a top plan view of the embodiment of FIG. 4.

With reference to FIGS. 4 and 5, the ant station may be combined with a bait station for rodents in a single multi-compartment unit. The ant liquid bait compartment of this unit is similar to the bait station in FIGS. 2 and 3. It has an inner container 121 serving as a reservoir for liquid bait. The inner container 121 has a lid 123 with holes 124 for providing access to the bait. A pair of tangs 125 on the underside of the outer cover 126 of the unit hold down the inner container's lid 123 to eliminate spillage. A set of access ports 122 in the back outer wall 129 of the unit allow the ants to enter the unit, giving them access to the inner container 121 and the bait inside it via the holes 124 in the lid 123. Side and front walls 127 and 128 isolate the ant compartment from the remainder of the unit. These walls 127 and 128 extend to the cover 126 when the unit is closed, keeping ants feeding on the bait in the inner container 121 from reaching the rodent bait.

For the combined ant/rodent station, the outer container walls 129 and 130 are enlarged to provide room inside for a rodent bait compartment 131 and adjacent passageways 132. The rodent bait compartment 131 includes a bait rod or rack 133 on which pieces of solid rodent bait 136 are hung. The bait rod 133 is suspended above the floor of the compartment 131 by means of support brackets 135 on side walls 134 of the compartment 131. The side walls 134 generally are extensions of the side walls 127 for the ant compartment. The rear wall 128 of the rodent bait compartment 131 is also the front wall of the ant bait compartment, and completely separates and isolates the two compartments from each other so that ants do not disturb the feeding of the rodents. The front of the rodent compartment 131 is open except for a short partition 137 extending between the two side walls 134 along the floor of the compartment 131 to keep any solid bait 136 that may fall from the rack 133 inside the compartment 131 while still allowing rodents access to the bait 136 on which to feed. Rodents can enter the bait station through openings 139 in the outer wall 130, and travel along the passageways 132 between the outer wall 130 and bait compartment side walls 134 to the compartment 131. The openings 139 are small enough to keep cats, chickens and other large animals out, while allowing mice and rats in.

Typical dimensions for the bait station unit are about 13 inches (33 cm) wide from side to side, about 10 inches (25 cm) long from front to back, and about 3¾ to 4 inches (10 cm) high from floor to cover. The inner container 121 of the ant bait station is about 5½ inches (14 cm) long from side to side, 2 inches (5 cm) wide from front to back and 3 inches (7.6 cm) high from floor to lid. The tangs 125 depending from cover 126 make contact with the upper surface of lid 123 when the cover 126 is closed, thereby keeping it closed. The ant openings 122 and 124 are typically about ½ inch (13 mm) diameter. The rodent doors 139 are typically about 2¼ to 2⅜ inch (5.7 to 6.0 cm) diameter, and the passageways 132 have a similar width. The rodent bait compartment 131 may be about 7¾ inch (20 cm) wide at its back wall 128, about 5⅜ to 5½ inch (14 cm) wide at its front partition 137, and about 2⅜ to 2½ inch (6 cm) deep from partition to back wall. The partition 137 is about 1 inch (2.5 cm) high and the rack or rod 133 is typically suspended about 1½ to 2 inches (4 to 5 cm) above the floor. The walls 127, 129, 130 and 134 have the same height as the unit as a whole so that the outer cover 126 contacts each of these walls when closed.

The top edge of the outer wall 130 and the outer edge of the cover 126 may have pairs of tabs 141 and 142 that engage one another when the cover 126 is shut and that keep the cover 126 securely closed. Alternatively, or in addition, the outer wall 130 and cover 126 may have a tamper-resistant locking mechanism like that in the bait station of FIGS. 2 and 3. In particular, the outer wall 130 may include a front center portion 143 of increased thickness with a vertical bore or channel 144 therethrough. The cover 126 may likewise have a hole 145 in a position that aligns with the channel 144 when the cover 126 is closed. Thus a stake may be passed through the hole 145 and channel 144 then into the ground to anchor the bait unit to the ground. If the stake is threaded, like the screw 111 in FIG. 2, the stake locks the unit shut even when it is removed from the ground. The channel 144 may be pre-threaded or may have its internal threads tapped by the screw-like stake.

We claim:

1. A bait station comprising:
    a container with a lid closeable over the container, the container having at least one internal compartment defined therein, with one or more container access ports in said container leading from an exterior of the container to said internal compartment, said access ports being of a size admitting target creatures to said compartment,
    a reservoir for holding liquid bait for the target creatures, said reservoir located within said at least one internal compartment, said reservoir being entirely closed on all sides from said internal compartment at least while said container lid is closed except for at least one reservoir access port at a top of said reservoir allowing target creatures within said internal compartment access to liquid bait in said reservoir;
    wherein said reservoir comprises a box within said container with a hinged cover for said box separate from the container lid, said container lid having at least one hold-down tang depending therefrom and contacting a top of the box cover when the container lid is closed.

2. The bait station of claim 1 wherein each said reservoir access port comprises a hole in the box cover.

3. The bait station of claim 1 wherein said internal compartment is defined by a space inside the container around the box that forms the reservoir.

4. A bait station comprising:
    a container with a lid closeable over the container, the container having at least one internal compartment defined therein, with one or more container access ports in said container leading from an exterior of the container to said internal compartment, said access ports being of a size admitting target creatures to said compartment,
    a reservoir for holding liquid bait for the target creatures, said reservoir located within said at least one internal compartment, said reservoir being entirely closed on all sides from said internal compartment at least while said container lid is closed except for at least one reservoir access port at a top of said reservoir allowing target creatures within said internal compartment access to liquid bait in said reservoir;
    wherein said lid is held securely closed by a vertical channel in an enlarged portion of a container wall, a hole in the container lid at a location matching said channel, and a stake insertable into said hole and said vertical channel.

5. The bait station of claim 4 wherein said stake is threaded.

6. The bait station of claim 4 wherein said stake has a length greater than said channel allowing the stake to double as a ground anchor.

7. A bait station, comprising:
    nested inner and outer containers with the inner container having at least one side wall spaced apart from a corresponding wall of the outer container to define an internal compartment therebetween, and with the inner and outer containers having separate lids, the lid of the outer container having tangs depending therefrom which hold the lid of the inner container shut whenever the outer container is closed, the inner container forming a reservoir for liquid bait, the outer container having at least one access port therein leading to said internal compartment, the inner container having reservoir access ports in the lid of said inner container, said inner container lid being accessible from said internal compartment.

8. The bait station of claim 7 wherein said inner and outer containers share a floor and front and rear walls.

9. The bait station of claim 7 wherein said inner container includes a grid-shaped insert with walkways defined in an upper surface of said insert.

10. The bait station of claim 7 wherein a front wall of said outer container has a thicker central portion with a vertical channel therethrough.

* * * * *